United States Patent
Zhang et al.

(10) Patent No.: US 11,587,355 B2
(45) Date of Patent: Feb. 21, 2023

(54) TRACKING CONTROL METHOD, DEVICE, AND AIRCRAFT

(71) Applicant: SZ DJI TECHNOLOGY CO., LTD., Shenzhen (CN)

(72) Inventors: Wei Zhang, Shenzhen (CN); Lei Pang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 166 days.

(21) Appl. No.: 16/664,804

(22) Filed: Oct. 26, 2019

(65) Prior Publication Data

US 2020/0057881 A1    Feb. 20, 2020

Related U.S. Application Data

(63) Continuation of application No. PCT/CN2017/082562, filed on Apr. 28, 2017.

(51) Int. Cl.
| | |
|---|---|
| *G06K 9/00* | (2022.01) |
| *G06V 40/16* | (2022.01) |
| *G06V 40/10* | (2022.01) |
| *B64C 39/02* | (2023.01) |

(52) U.S. Cl.
CPC ............ *G06V 40/166* (2022.01); *G06V 40/10* (2022.01); *B64C 39/024* (2013.01); *B64C 2201/127* (2013.01); *G06T 2207/10032* (2013.01); *G06T 2207/30201* (2013.01); *G06V 2201/07* (2022.01)

(58) Field of Classification Search
CPC ............ G06T 7/00; G06T 7/246; G06T 7/70; G06T 2207/10032; G06T 2207/30232; G06T 2207/30244; G06T 2207/30196; G06T 7/73; G06K 9/00624; G06K 9/00362; G06V 20/58; G06V 20/00; G06V 40/10; G06V 2201/07; G06V 20/56
See application file for complete search history.

(56) References Cited

U.S. PATENT DOCUMENTS

| | | | |
|---|---|---|---|
| 2012/0062732 A1* | 3/2012 | Marman | G08B 13/19682 348/142 |
| 2012/0189164 A1 | 7/2012 | Feris et al. | |
| 2013/0182114 A1* | 7/2013 | Zhang | A61B 5/0046 348/150 |
| 2014/0024999 A1* | 1/2014 | Levien | G16H 40/67 604/66 |

(Continued)

FOREIGN PATENT DOCUMENTS

| | | |
|---|---|---|
| CN | 103634521 A | 3/2014 |
| CN | 103679142 A | 3/2014 |

(Continued)

OTHER PUBLICATIONS

The World Intellectual Property Organization (WIPO) International Search Report for PCT/CN2017/082562 dated Jan. 29, 2018 5 pages.

*Primary Examiner* — Guillermo M Rivera-Martinez
(74) *Attorney, Agent, or Firm* — Anova Law Group, PLLC

(57) ABSTRACT

A tracking control method includes obtaining a tracking parameter of a target object. The tracking control method also includes determining a characteristic part of the target object based on the tracking parameter. The tracking control method further includes tracking the target object based on the characteristic part.

9 Claims, 9 Drawing Sheets

(56) References Cited

U.S. PATENT DOCUMENTS

| | | | | |
|---|---|---|---|---|
| 2014/0056472 A1* | 2/2014 | Gu | ............... | G06T 7/194 382/103 |
| 2014/0072170 A1* | 3/2014 | Zhang | ............ | G06T 7/75 382/103 |
| 2014/0270484 A1* | 9/2014 | Chandraker | ......... | G06T 7/246 382/154 |
| 2015/0199559 A1 | 7/2015 | Sztuk et al. | | |
| 2015/0205301 A1* | 7/2015 | Gilmore | ............ | G01S 19/13 701/11 |
| 2016/0021315 A1* | 1/2016 | Tsubusaki | ......... | H04N 5/23296 348/240.1 |
| 2016/0031559 A1* | 2/2016 | Zang | ................. | G06F 3/04883 701/2 |
| 2016/0241767 A1* | 8/2016 | Cho | ................. | G06F 3/0346 |
| 2016/0299229 A1* | 10/2016 | Heinonen | .......... | G01S 17/933 |
| 2016/0360087 A1* | 12/2016 | Kwon | ............ | H04N 5/232933 |
| 2017/0083748 A1* | 3/2017 | Zhou | ................. | G06K 9/6228 |
| 2017/0094184 A1* | 3/2017 | Gao | ............... | H04N 5/23296 |
| 2017/0098132 A1* | 4/2017 | Yokota | ............ | G06T 7/194 |
| 2017/0134631 A1* | 5/2017 | Zhao | ............... | G06T 7/248 |
| 2019/0096069 A1* | 3/2019 | Qian | ................. | G06T 7/74 |
| 2019/0154439 A1* | 5/2019 | Binder | ............ | G01S 15/08 |

FOREIGN PATENT DOCUMENTS

| | | | | |
|---|---|---|---|---|
| CN | 105139420 A | | 12/2015 | |
| CN | 105678809 A | | 6/2016 | |
| CN | 105847684 A | * | 8/2016 | |
| CN | 105847684 A | | 8/2016 | |
| CN | 105894538 A | | 8/2016 | |
| CN | 105979147 A | * | 9/2016 | |
| CN | 105979147 A | | 9/2016 | |
| CN | 106204647 A | | 12/2016 | |
| CN | 106292721 A | | 1/2017 | |
| WO | 2016029170 A1 | | 2/2016 | |
| WO | WO-2017045116 A1 | * | 3/2017 | ............ B64C 39/024 |

* cited by examiner

TRACKING CONTROL METHOD, DEVICE, AND AIRCRAFT

CROSS-REFERENCE TO RELATED APPLICATION

This application is a continuation application of International Application No. PCT/CN2017/082562, filed on Apr. 28, 2017, the entire content of which is incorporated herein by reference.

TECHNICAL FIELD

The present disclosure relates to the technology field of electronics and, more particularly, to a tracking control method, a device, and an aircraft.

BACKGROUND

In tracking strategies of currently available aircrafts, in order to track a target object having prominent characteristics, typically, during the process of tracking a characteristic part (e.g., human face) of the target object, because the distance between the aircraft and the target object is changing, the dimensional proportion of the tracking frame of the target object in the captured image may also change. As a result, the tracking effect may be affected. For example, when tracking a same characteristic part of the target object, and when the distance between the aircraft and the target object becomes closer, the dimensional proportion of the tracking frame of the target object in the captured image is relatively large (e.g., 10%), which may reduce the tracking speed, which in turn tends to cause the loss of tracking of the target object. In the meantime, the robustness of the tracking control is reduced. When the distance between the aircraft and the target object becomes farther, the dimensional proportion of the tracking frame of the target object in the captured image is relatively small (e.g., 5%), which may cause the characteristics of the tracked target object to become blurry, and reduce the robustness of the tracking control.

Therefore, using the currently available tracking strategies to track the target object tends to cause loss of tracking of the target object. In addition, the robustness of the tracking control is poor.

SUMMARY

In accordance with an aspect of the present disclosure, there is provided a tracking control method that includes obtaining a tracking parameter of a target object. The tracking control method also includes determining a characteristic part of the target object based on the tracking parameter. The tracking control method further includes tracking the target object based on the characteristic part.

In accordance with another aspect of the present disclosure, there is provided a tracking control device that includes an acquisition module configured to obtain a tracking parameter of a target object. The tracking control device also includes a determination module configured to determine a characteristic part of the target object based on the tracking parameter. The tracking control device further includes a tracking module configured to track the target object based on the characteristic part.

In accordance with another aspect of the present disclosure, there is provided an aircraft. The aircraft includes a storage device configured to store computer-executable program instructions. The aircraft also includes a processor coupled with the storage device through a bus and configured to execute the computer-executable program instructions stored in the storage device to obtain a tracking parameter of a target object. The processor is also configured to determine a characteristic part of the target object based on the tracking parameter. The processor is further configured to track the target object based on the characteristic part.

According to embodiments of the present disclosure, tracking parameters of the target object may be obtained. Characteristic parts of the target object may be determined based on the tracking parameters. The target object may be tracked based on the characteristic parts. The characteristic parts of the tracked target object may be re-determined based on the tracking parameters, thereby avoiding loss of tracking of the target object, which increases the robustness of the tracking control.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1A:
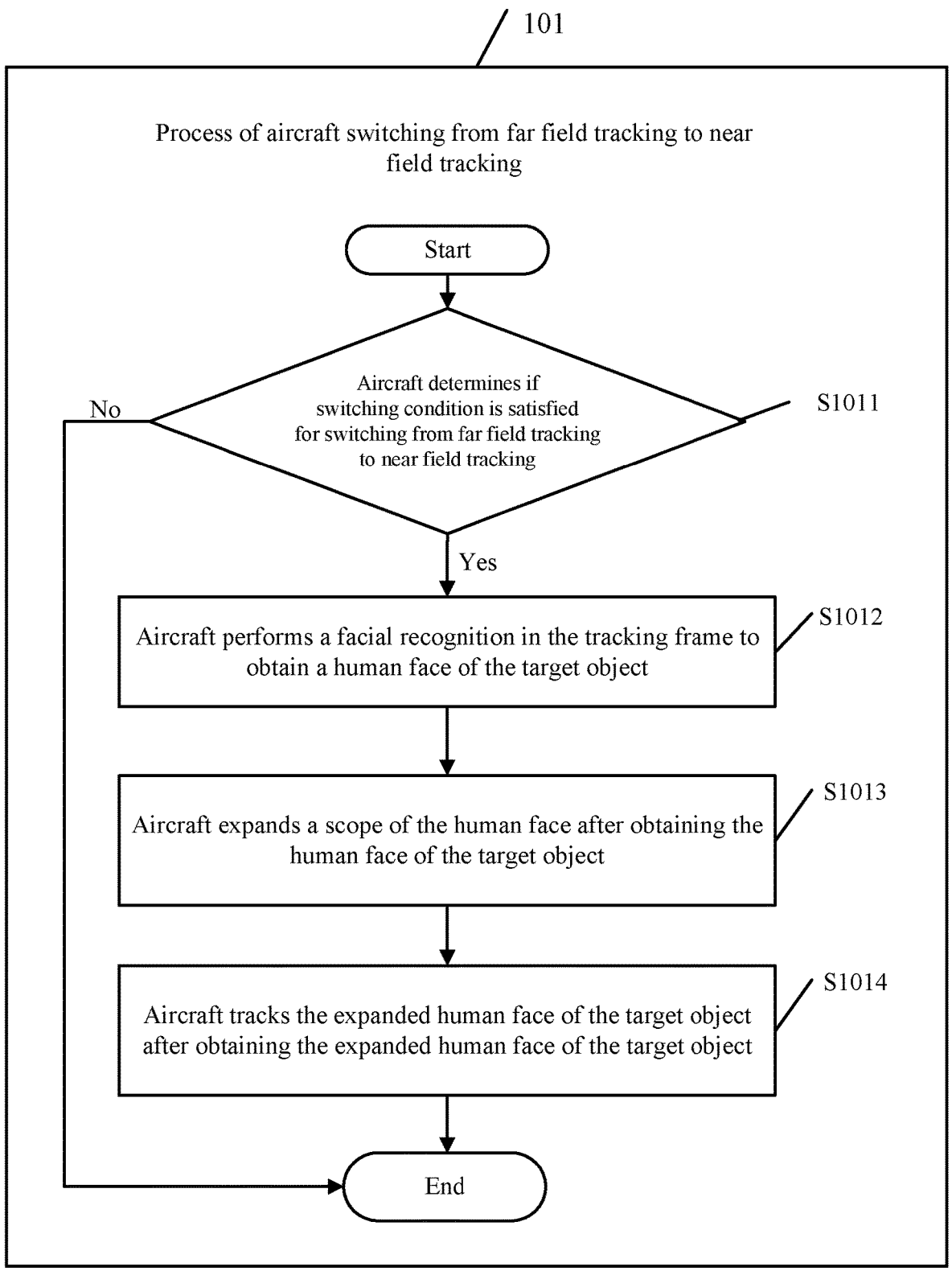
FIG. 1a is a flow chart illustrating a process of an aircraft switching from a far field tracking to a near field tracking, according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "communicatively couple(d)" or "communicatively connect(ed)" indicates that related items are coupled or connected through a communication channel, such as a wired or wireless communication channel. The term "unit," "sub-unit," or "module" may encompass a hardware component, a software component, or a combination thereof. For example, a "unit," "sub-unit," or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The present disclosure provides a tracking control method, a device, and an aircraft, configured to re-determine a characteristic part of a tracked target object based on a tracking parameter, thereby avoiding loss of tracking of the target object, and increasing the robustness of the tracking control. Various aspects of the present disclosure will be explained in detail below.

In the present disclosure, it can be known from actual tracking by an aircraft, the tracking process includes two aspects. One aspect is a process of the aircraft switching from far field tracking to near field tracking. Another aspect is a process of the aircraft switching from near field tracking to far field tracking. Next, these two aspects will be described in detail.

The near field tracking and far field tracking may be defined based on one or more tracking parameters, such as at least one of a distance between the aircraft and the tracked target object, and the dimensional proportion of the tracking frame in the captured image. For example, near field tracking may refer to the tracking when the distance between the aircraft and the tracked target object is smaller or equal to a predetermined distance value, and far field tracking may refer to the tracking when the distance between the aircraft and the tracked target object is greater than the predetermined distance value.

FIG. 1a is a schematic illustration of a process of the aircraft switching from far field tracking to near field tracking. The process or method may include:

101: the process or method of the aircraft switching from far field tracking to near field tracking.

S1011: the aircraft determines whether a switching condition for switching from far field tracking to near field tracking is satisfied; if it is satisfied, step S1012 may be executed; if it is not satisfied, the process may be terminated.

In far field tracking, the target object tracked by the aircraft is a human body. When the aircraft approaches the target object, i.e., when the aircraft switches from far field tracking to near field tracking, the dimensional proportion of the tracking frame in the captured image may increase, thereby causing the tracking speed to slow down. Accordingly, the aircraft may determine a characteristic part of the target object that is to be tracked in near field tracking, to increase the tracking efficiency.

In some embodiments, the aircraft may determine whether a switching condition for switching from far field tracking to near field tracking is satisfied based on one or more flight parameters, such as a tracking speed, a dimensional proportion of the tracking frame in the captured image, a distance between the target object and the aircraft, etc. When the tracking speed is smaller than a predetermined speed value, and/or, when the dimensional proportion is greater than or equal to a predetermined dimensional proportion value (e.g., 10%), and/or, when the distance between the target object and the aircraft is smaller than or equal to a predetermined distance value (e.g., 3 m), the aircraft may determine that the switching condition for switching from far field tracking to near field tracking is satisfied.

In some embodiments, the predetermined speed value, the predetermined dimensional proportion value, the predetermined distance value may be dynamically set by the UAV based on a tracking accuracy, tracking speed (e.g., tracking efficiency), or may be set by a user based on the user's preference, which is not limited by the present disclosure.

In some embodiments, the aircraft may need to determine a characteristic part of the target object to be tracked in near field tracking. Because in near field tracking, characteristics of a human face are relatively prominent, the aircraft may track the human face or the human face and the shoulder of the target object, to increase the tracking efficiency and the robustness of the tracking control. Detailed steps of the aircraft determining the human face or human face and shoulder of the target object to be tracked in near field tracking may include:

S1012: the aircraft performs a facial recognition in the tracking frame to obtain a human face of the target object.

Figure 2:
FIG. 2 is a schematic illustration of searching for a human face within a tracking frame, according to an example embodiment.

In some embodiments, the aircraft may perform facial recognition in the tracking frame to detect a human face included in the tracking frame. The aircraft may determine a searching center point in the tracking frame, and may search for a human face using the searching center point as a center. The aircraft may determine that a human face that is located closest to the searching center point as the human face of the target object. For example, the searching center point may be a point on a center line of the tracking frame, where a ratio between a distance from the point to a lower edge of the tracking frame and a distance from the point to an upper edge of the tracking frame is a predetermined ratio value. The aircraft may search for a human face using the searching center point as a center. The predetermined ratio value may be set based on actual need. For example, the predetermined ratio value may be any suitable value in the range of 0.5-0.9. The above range of the predetermined ratio value is only illustrative. The present disclosure does not limit the range. For example, the predetermined ratio value may be set as 0.9. As shown in FIG. 2, the aircraft may use the black dot in the tracking frame as a center to search for a human face, and may find a human face that is closest to the black dot, and use that human face as the human face of the target object.

In some embodiments, when the tracking of the tracked target object is lost, because it is known that currently the human face or the human face and shoulder of the tracked target object is tracked, a targeted searching may be performed in the regions of the tracking frame based on location information of a human face, which makes it easier to find the human face or human face and shoulder of the tracked target object.

S1013: the aircraft expands a scope of the human face after obtaining the human face of the target object.

In some embodiments, after obtaining the human face of the target object, because the scope of the human face is too small, which is not helpful for tracking, the scope of the human face may be expanded, such that a combination of various parts, such as the human face, the shoulder, and the neck may be tracked, thereby increasing the robustness of the tracking control. For example, the characteristics are more prominent when the human face is a front face as compared to when the human face is a side face. Accordingly, different expansion strategies may be used to obtain suitable expansion scopes when the human face is a front face and when the human face is a side face, which may further increase the robustness of the tracking control.

In some embodiments, the front face means the human face of the target object is right in front of the lens of the imaging device of the aircraft. The side face means that left side or the right side of the human face of the target object is right in front of the lens of the imaging device of the aircraft, i.e., the side face includes the face facing left and the face facing right.

In some embodiments, a facial recognition may be performed on the human face of the target object to determine whether the human face is a front face or a side face. For example, the aircraft may use a facial recognition algorithm to detect the human face of the target object, to obtain location information of the left and right eyes, the nose tip, and the corners of the mouth of the human face, and the location information of a center point of the eyes. The aircraft may determine whether the human face of the target object is a front face or a side face based on the symmetry of the center point of the two eyes and the nose tip. In some embodiments, the determination may be based on the following equations and algorithms.

$$
\begin{aligned}
&\text{dist\_leye2nose} = (x\_nose - x\_leye) / (x\_reye - x\_leye) \\
&\text{dist\_reye2nose} = (x\_reye - x\_nose) / (x\_reye - x\_leye) \\
&\text{if abs (dist\_leye2nose} - \text{dist\_reye2nose}) > 0.35 \\
&\quad \text{the human face of the target object is a front face;} \\
&\text{else} \\
&\quad \text{the human face of the target object is a side face;} \\
&\text{if dist\_leye2nose} > \text{dist\_reye2nose} \\
&\quad \text{the human face of the target object is facing left;} \\
&\text{else} \\
&\quad \text{the human face of the target object is facing right;}
\end{aligned}
$$

In the above equations and algorithms, dist_leye2nose represents a distance from the left eye of the human face of the target object to the nose, dist_reye2nose represents a distance of the right eye of the human face of the target object to the nose, x_nose represents a horizontal coordinate of the nose, x_leye represents a horizontal coordinate of the left eye, x_reye represents a horizontal coordinate of the right eye, abs( ) represents an absolute value of certain data.

In some embodiments, the aircraft may expand the current tracking frame to enlarge the tracking frame, thereby expanding the scope of the human face.

In some embodiments, when the human face of the target object is a front face, an expansion factor may be set, and the current tracking frame may be expanded, such that the tracking frame may be elongated horizontally and vertically. For example, the expansion factor may be set as 1.7. The expansion of the current tracking frame may be based on the following equations and algorithms:

$$
\begin{aligned}
&\text{expand} = 1.7; \\
&\text{box\_x} = x; \\
&\text{box\_y} = y + h*\text{expand} *0.25; \\
&\text{box\_w} = w*\text{expand}*1.35; \\
&\text{box\_h} = h*\text{expand};
\end{aligned}
$$

In the above equations and algorithms, expand represents the expansion factor, x represents the horizontal coordinate of a center point of the current tracking frame, y represents a vertical coordinate of the center point of the current tracking frame, h represents a height of the current tracking frame, w represents a width of the current tracking frame, box_x represents a horizontal coordinate of a center point of the expanded tracking frame, box_y represents a vertical coordinate of the center point of the expanded tracking frame, box_h represents a height of the expanded tracking frame, and box_w represents a width of the expanded tracking frame.

When the human face of the target object is a side face, an expansion factor may also be set. The current tracking frame may be expanded, such that when the human face faces the left the tracking frame is elongated horizontally to the left and elongated vertically. When the human face faces the right the tracking frame is elongated horizontally to the right and elongated vertically. For example, the expansion factor may be set as 2.0, and the current tracking frame may be expanded based on the following equations and algorithms:

```
expand = 2
box_x = x+direction *box_w; //human face facing left,
direction=-1; human face facing right, direction=1;
    box_y = y + h*expand *0.25;
    box_w = w*expand*1.5;
    box_h = h*expand;
```

In the above equations and algorithms, direction represents a weight value corresponding to a facing direction of the human face. When the human face is a side face, after the tracking frame is expanded according to the above equations and algorithms, the tracking frame may be further expanded one more time, such that the head and shoulder of the target object may be tracked. For example, when the side face faces the left, the tracking frame may be horizontally expanded to the right to double the dimension. When the side face faces the right, the tracking frame may be horizontally expanded to the left to double the dimension.

In some embodiments, the larger the expansion factor, the larger the tracking frame after expansion, and the more the characteristics of the human body that are tracked (which may include the human face and parts other than the human face). Accordingly, the robustness of the tracking control may be increased. However, the tracking speed may become slower. Therefore, the value of the expansion factor may be set based on a compromise between the robustness of the tracking control and the tracking speed. In some embodiments, the value of the expansion factor may be set based on personal preferences of the user. In some embodiments, because the characteristics of the human face of the target object are more prominent when the human face is a front face as compared to a side face. Thus, when the human face is a front face, a relatively small expansion factor (e.g., 1.8) may be set. When the human face is a side face, a relatively large expansion factor (e.g., 2.1) may be set.

In some embodiments, through expanding the tracking frame, the tracking frame becomes larger. That is, a human face of the target object after the scope expansion may be obtained. The expanded human face of the target object may include the human face and the shoulder and/or other parts of the target object. The head and shoulder model is a very prominent characteristic because they are located at the upper half of the human body. Thus, the disclosed method can significantly increase the robustness of the tracking control.

S1014: the aircraft tracks the expanded human face of the target object after obtaining the expanded human face of the target object.

Figure 3:
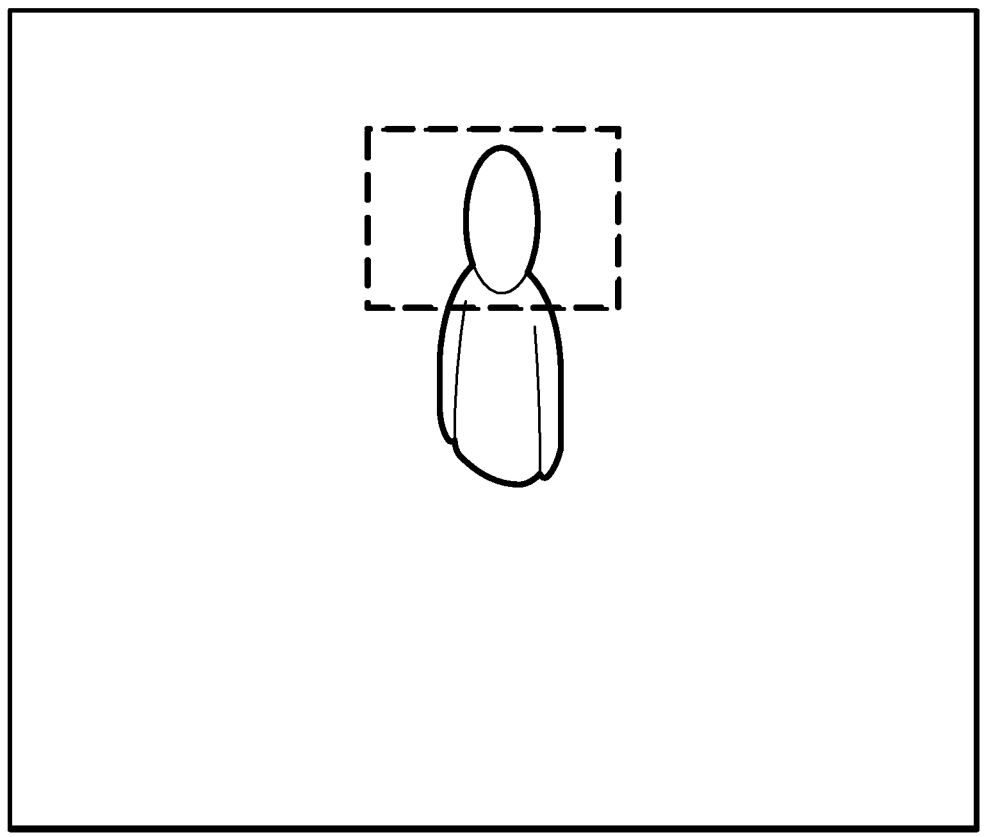
FIG. 3 is a schematic illustration of tracking a human face and a shoulder, according to an example embodiment.

In some embodiments, in near field tracking, the aircraft may track determined human face and shoulder of the target object, to increase the tracking efficiency and the robustness. As shown in FIG. 3, the solid-line frame is a captured image, the dashed-line frame is a tracking frame. The human face and shoulder of the target object are within the tracking frame.

Figure 1B:
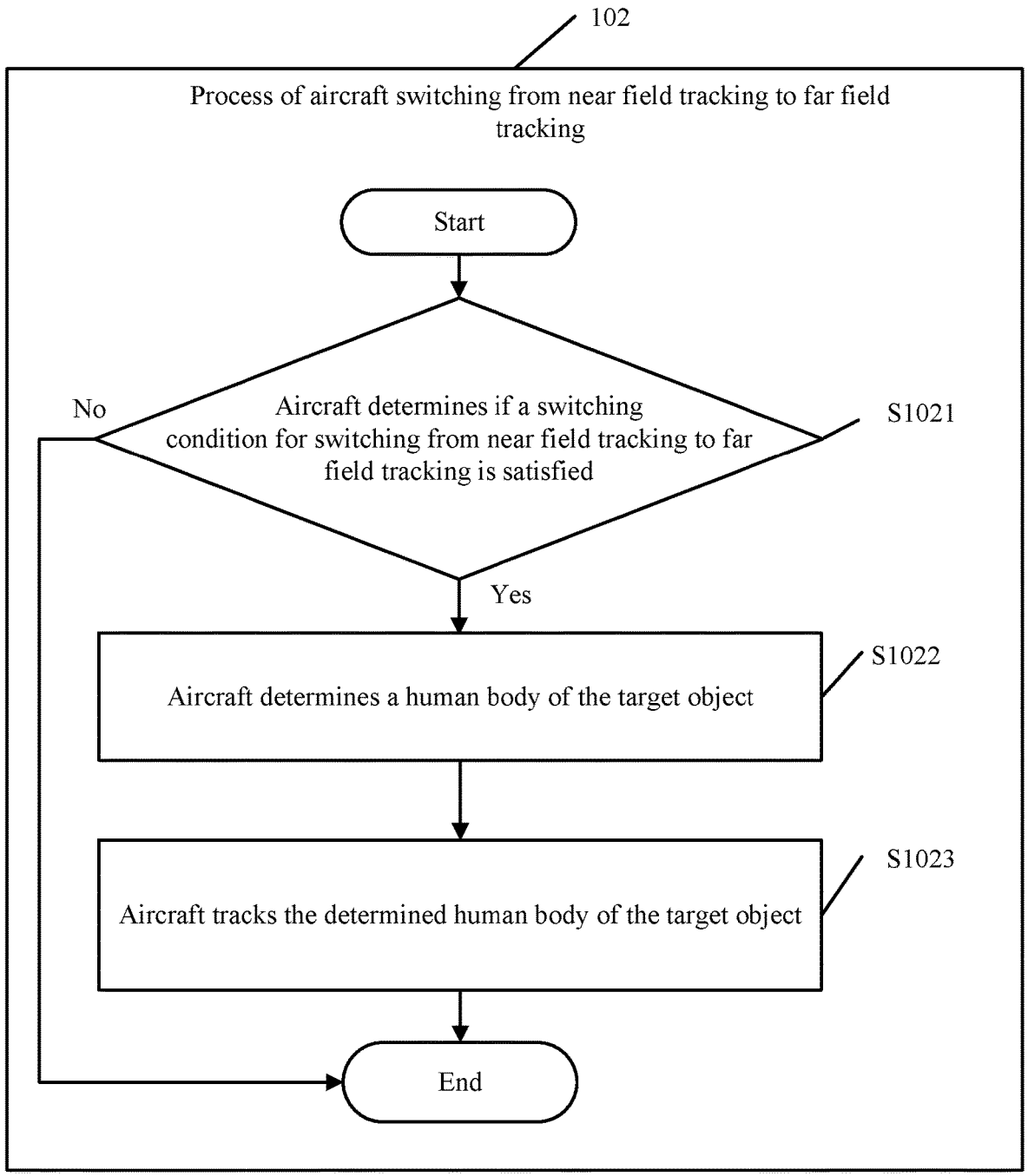
FIG. 1b is a flow chart illustrating a process of an aircraft switching from a near field tracking to a far field tracking, according to an example embodiment.

FIG. 1*b* is a flow chart illustrating a process or method of the aircraft switching from near field tracking to far field tracking. The process or method may include:

102: a process of the aircraft switching from near field tracking to far field tracking.

S1021: the aircraft determines whether a switching condition for switching from near field tracking to far field tracking is satisfied; if it is satisfied, step S1022 may be executed; if it is not satisfied, the process may be terminated.

In near field tracking, the aircraft tracks the human face of the target object or the expanded human face of the target object. When the aircraft is far away from the target object, i.e., when the aircraft switching from near field tracking to far field tracking, the dimensional proportion of the tracking frame in the captured image may become smaller, and the tracking accuracy may be reduced. Thus, the aircraft may determine characteristic parts of the target object for tracking in the far field tracking, to increase the tracking accuracy.

In some embodiments, the aircraft may determine whether the switching condition for switching from the near field tracking to the far field tracking is satisfied based on one or more flight parameters, such as the tracking speed, the dimensional proportion of the tracking frame in the captured image, and the distance between the target object and the aircraft. When the tracking accuracy is smaller than a predetermined accuracy value, and/or, when the dimensional proportion is smaller than or equal to a predetermined dimensional proportion value, and/or, when the distance between the target object and the aircraft is greater than or equal to a predetermined distance value, the aircraft may determine that the switching condition for switching from near field tracking to far field tracking is satisfied.

In some embodiments, the predetermined accuracy value, the predetermined dimensional proportion value, and the predetermined distance value may be dynamically set by the aircraft based on the far field tracking speed (e.g., tracking efficiency) and the robustness of the tracking control, or may be set based on personal preferences of the user. In some embodiments, during the process of switching from far field tracking to near field tracking and during the process of switching from near field tracking to far field tracking, the corresponding predetermined dimensional proportion values and the predetermined distance values may be different, or may be the same, which are not limited by the present disclosure.

In some embodiments, the aircraft may need to determine one or more characteristic parts of the target object for far field tracking. Because the characteristics of the human body are relatively prominent in far field tracking, the aircraft may track the human body of the target object to increase the robustness of the tracking control. The detailed steps for the aircraft to determine the human body of the target object for far field tracking may include:

S1022: the aircraft determines a human body of the target object.

Figure 4:
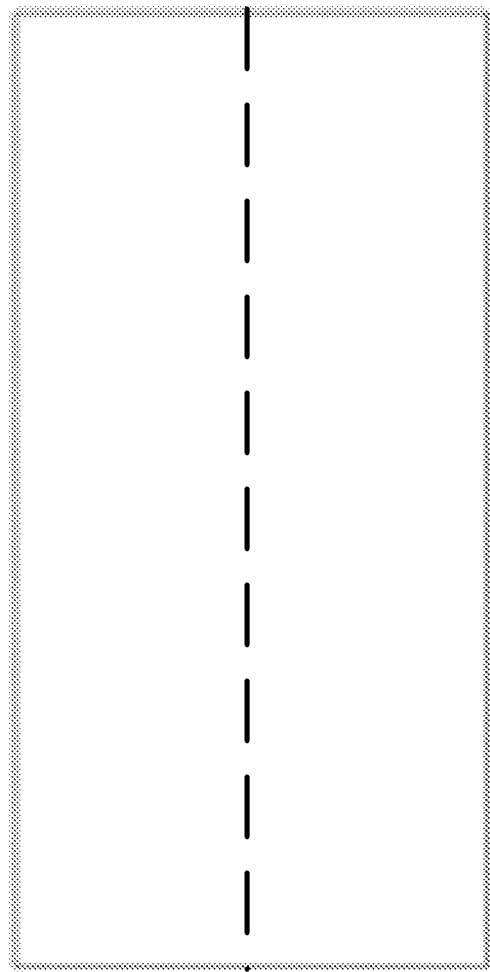
FIG. 4 is a schematic illustration of searching for a human body within a tracking frame, according to an example embodiment.

In some embodiments, the aircraft may obtain one or more human bodies in the captured image and a center line of the tracking frame. As shown in FIG. 4, the aircraft may search for one or more human bodies adjacent the center line of the tracking frame. The aircraft may determine a human body closest to the center line among the one or more human bodies in the captured image as the human body of the target object.

In some embodiments, when the tracked target object is lost, because it is known that the currently tracked target object is a human body, a targeted searching in regions of the tracking frame may be performed based on location information of the human body, making it easier to find the human body of the tracked target object.

S1023: the aircraft tracks the determined human body of the target object.

Figure 5:
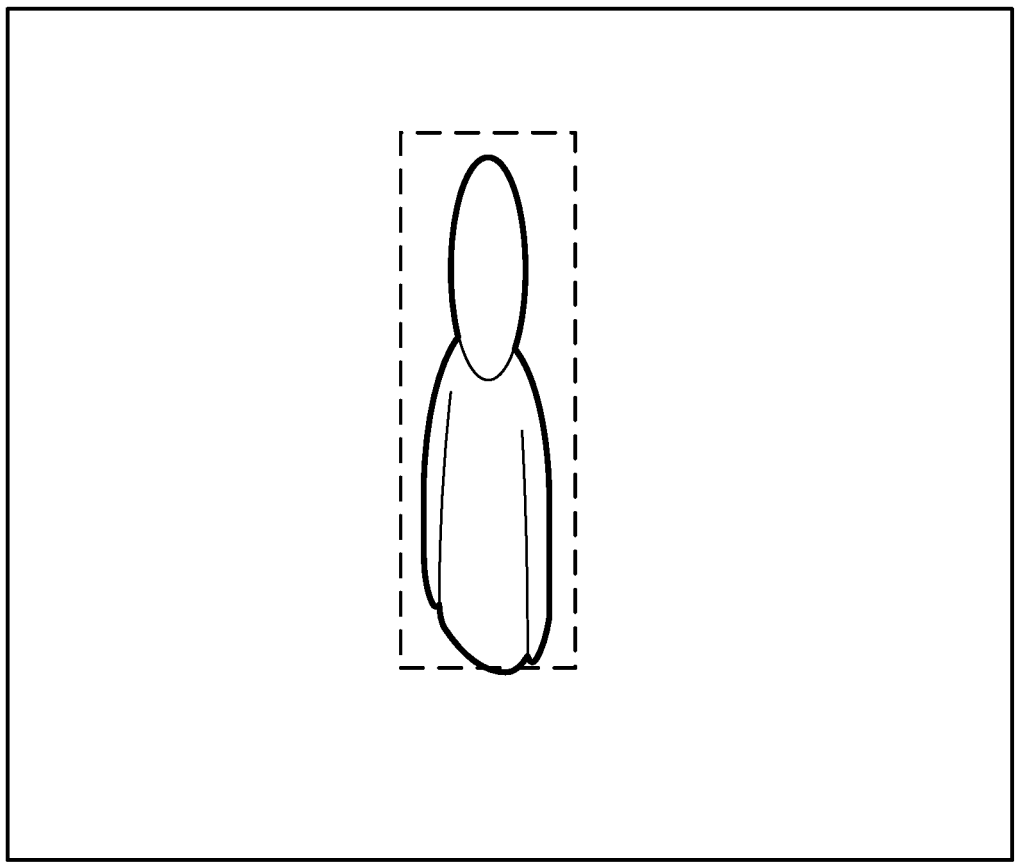
FIG. 5 is a schematic illustration of tracking a human body, according to an example embodiment.

In some embodiments, in far field tracking, the aircraft may track the determined human body of the target object to increase the robustness of the tracking control. As shown in FIG. 5, the solid-line frame is the captured image, the dashed-line frame is the tracking frame, and the human body of the target object is in the tracking frame.

In some embodiments, when switching between the far field tracking and the near field tracking, because the size of the tracking frame may change, the size of the tracking frame may be inconsistent with the size of the tracked target object. Thus, other auxiliary methods may be used to determine the switching condition to increase the switching accuracy. For example, depth sensor technology and image projection relationship may be used to find a depth corresponding to the tracked target object in the captured image, thereby obtaining the distance between the aircraft (e.g., unmanned aerial vehicle) and the target object. If the distance is too close (e.g., smaller than or equal to 3 m), the tracking may be switched to near field tracking. If the distance is too far (e.g., greater than 4 m), the tracking may be switched to far field tracking. In addition, a distance measurement method (e.g., a binocular distance measurement method, an ultrasound distance measurement method, or a Lidar distance measurement method, etc.) may be directly used to measure the distance between the tracked target object and the aircraft, thereby assisting in determining the switching condition in an auxiliary manner.

For example, when the tracked target object is a human, and when the aircraft detects the target object, the process of tracking switch may be triggered. The size of the tracking frame may be detected. If the dimensional proportion of the tracking frame in the captured image is greater than or equal to 30%, an automatic detection of the human face of the target object may be performed. The detected human face may be expanded, and the human face (e.g., human face and shoulder) after expansion may be tracked. Tracking may be switched from far field tracking to near field tracking. The process of switching from near field tracking to far field tracking may be similar.

As a further example, a selfie aircraft having a face scanning takeoff function may scan a human face to take off. After the face scanning is successful, the process of tracking switch of the aircraft may be started with near field tracking (e.g., tracking the human face or the human face and the shoulder). When the distance from the aircraft to the human is relatively large (e.g., 3 m), the aircraft may automatically switch to far field tracking (e.g., tracking the human body). The disclosed method may achieve the effect of automatically using the aircraft start-up user as a focus.

As a further example, when capturing videos from the near to the distant, the aircraft may directly take off from a user's hand, and fly in a slant rear-upper direction, and start tracking a human face. After the aircraft flies out (e.g., when the distance between the aircraft and the human is relatively large), the aircraft may track the human body of the human. In some embodiments, when the aircraft captures videos while circling in the air, after focusing on the human body, the aircraft may fly outwardly and spirally while capturing videos. In a process of switching between the far field tracking and near field tracking while circling and capturing videos, the aircraft may directly take off from the user's hand, and start flying in a spiral manner to capture and track the human face or the human face and the shoulder. After the aircraft flies out (e.g., when the distance between the aircraft and the human is relatively large), the aircraft may track the human body of the human.

In some embodiments, the tracked target object may be the human, or may be an object having prominent characteristics, which is not limited by the present disclosure.

In some embodiments, in the tracking process, the switching condition may be used to switch between the far filed tracking and near field tracking, making the tracking smoother, and increasing the efficiency of the tracking algorithm and the robustness of the tracking control. Further, in the tracking process, because it is known that the tracked object is a human body or a human face, when the tracked object is lost, a targeted search in regions of the tracking frame may be performed based on the location information of the human body or human face, making it easier to find the tracked object that has been lost.

Figure 6:
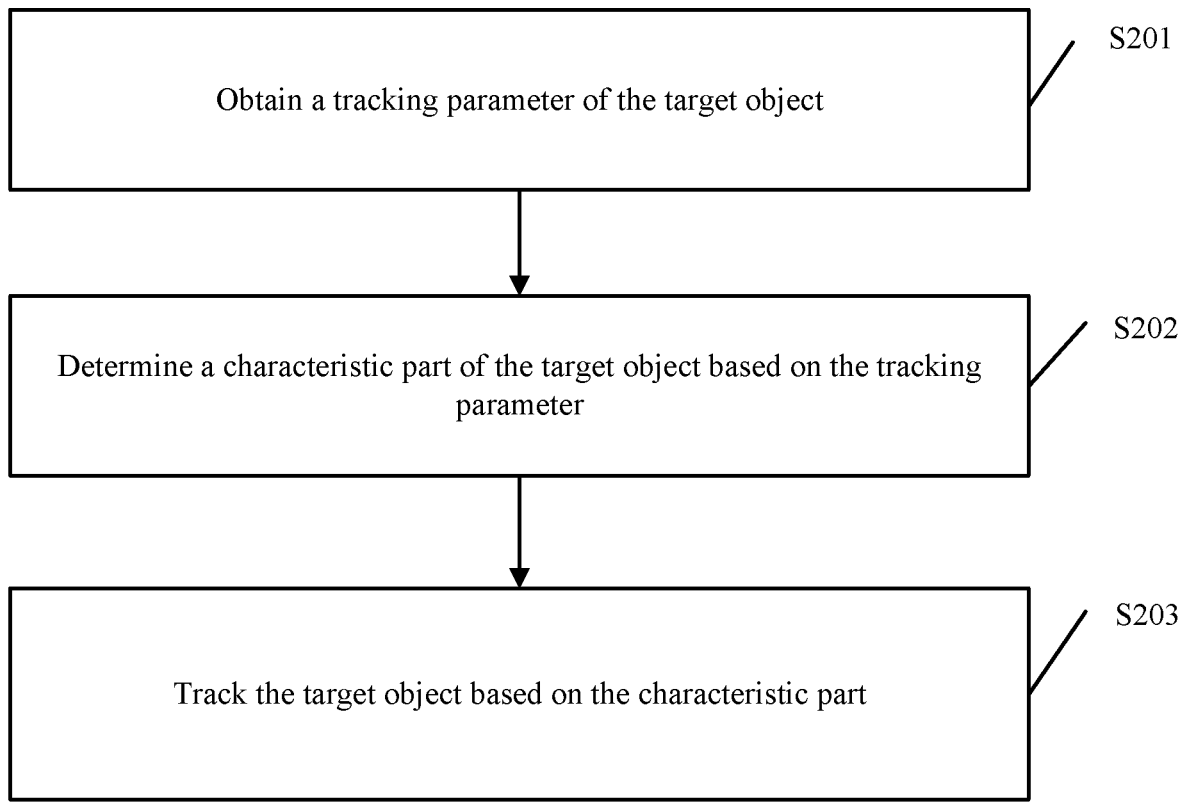
FIG. 6 is a flow chart illustrating a tracking control method, according to an example embodiment.

FIG. 6 is a flow chart illustrating a tracking control method. The tracking control method may include:

S201: obtaining a tracking parameter of the target object.

The tracking parameter may include: the dimensional proportion of the tracking frame of the target object in the captured image and/or the distance between the target object and the aircraft.

In some embodiments, the aircraft may obtain one or more tracking parameters, such as the dimensional proportion of the tracking frame of the target object in the captured image and/or the distance between the target object and the aircraft.

S202: determining a characteristic part of the target object based on the tracking parameter.

In some embodiments, the aircraft may determine whether to switch from near field tracking to far field tracking or from far field tracking to near field tracking based on the target tracking parameter. When determining that the switching is needed, the aircraft may determine the characteristic parts of the target object, such that different characteristic parts of the target object may be tracked under different tracking scene, thereby increasing the robustness of the tracking control.

In some embodiments, determining the characteristic parts of the target object based o the tracking parameter may include:

When the tracking parameter satisfies a first tracking condition, determining the characteristic part of the target object as a first characteristic part; the first characteristic part being a human body of the target object.

In some embodiments, the dimensional proportion is smaller or equal to a first predetermined dimensional proportion value, and/or the distance between the target object and the aircraft is greater than or equal to a first predetermined distance value.

In some embodiments, when the dimensional proportion is smaller than or equal to the first predetermined dimensional proportion value, and/or when the distance between the target object and the aircraft is greater than or equal to the first predetermined distance, i.e., the aircraft may switch from the near field tracking to far field tracking, it indicates that the distance between the aircraft and the target object is relatively large, and the aircraft may detect the human body of the target object, to track the human body of the target object.

In some embodiments, the first predetermined dimensional proportion and the first predetermined distance may be dynamically set by the aircraft based on the robustness of the far field tracking and the tracking speed, or may be set based on the personal preferences of the user, which is not limited by the present disclosure.

In some embodiments, determining that the characteristic part of the target object is the first characteristic part, the first characteristic part being a human body of the target object may include:

obtaining a center line of the tracking frame and one or more human bodies included the captured image;

determining a human body among the one or more human bodies included in the captured image that is closest to the center line as the human body of the target object;

determining the human body of the target object as the first characteristic part, and determining the first characteristic part as the characteristic part of the target object.

In some embodiments, the aircraft may obtain one or more human bodies included in the captured image, and a center line of the tracking frame. The aircraft may search for one or more human bodies located adjacent the center line of the tracking frame, and determine a human body among the one or more human bodies included in the captured image that is located closest to the center line as the human body of the target object. The aircraft may determine the human body of the target object as the first characteristic part, and determine the first characteristic part as the characteristic part of the target object. In near field tracking, the aircraft may use the human body of the target object as the tracking object.

In some embodiments, when the tracked object is lost, because it is known that the currently tracked object is the human body, a targeted searching in the regions of the tracking frame may be performed based on the location information of the human body, making it easier to find the human body of the tracked target object that has been lost.

In some embodiments, determining the characteristic part of the target object based on the tracking parameter may include:

When the tracking parameter satisfies a second predetermined tracking condition, determining a second characteristic part of the target object based on a human region of the target object, and determining the characteristic part of the target object to be the second characteristic part.

In some embodiments, the second predetermined tracking condition may include: the dimensional proportion is greater than or equal to a second predetermined dimensional proportion value, and/or, the distance between the target object and the aircraft is smaller than or equal to a second predetermined distance value.

In some embodiments, when the dimensional proportion is greater than or equal to the second predetermined dimensional proportion value, and/or, when the distance between the target object and the aircraft is smaller than or equal to the second predetermined distance, i.e., when the aircraft may switch from far field tracking to near field tracking, it may indicate that the distance between the aircraft and the target object is relatively small. The aircraft may determine the second characteristic part of the target object based on the human region of the target object, and determine the characteristic part of the target object as the second characteristic part.

In some embodiments, the second predetermined dimensional proportion value and the second predetermined distance may be dynamically set by the aircraft based on the robustness of the near field tracking control and the tracking speed, etc., or may be set based on personal preferences of the user, which is not limited by the present disclosure.

In some embodiments, the second characteristic part may include the human face and shoulder of the target object.

In some embodiments, determining the second characteristic part of the target object based on the human region of the target object, and determining the characteristic part of the target object as the second characteristic part may include:

performing a facial recognition in the tracking frame, and obtaining a human region of the target object in the captured image;

expanding the human region of the target object based on a predetermined expansion factor to obtain an expanded human region;

determining the second characteristic part of the target object included in the expanded human region as the characteristic part of the target object.

In some embodiments, the aircraft may perform a facial recognition in the tracking frame, to obtain a human region of the target object in the captured image. The aircraft may perform the facial recognition in the tracking frame to detect a human face included in the tracking frame. The aircraft may determine a searching center point in the tracking frame. The aircraft may search for the human face using the searching center point as the center point, and may determine a human face located closest to the searching center point as the human face of the target object. For example, the searching center point may be a point on a center line of the tracking frame, where a ratio between a distance from the point to a lower edge of the tracking frame and a distance from the point to an upper edge of the tracking frame is a predetermined ratio value. The aircraft may search for a human face using the searching center point as a center. The predetermined ratio value may be set based on actual need. For example, the predetermined ratio value may be any suitable value in the range of 0.5-0.9. The above range of the predetermined ratio value is only illustrative. The present disclosure does not limit the range.

In some embodiments, when the tracked object is lost, because it is known that the currently tracked object is a human face or a human face and a shoulder, a targeted search in the regions of the tracking frame may be performed based on location information of the human face, making it easier to find the human face or the human face and the shoulder of the tracked target object.

In some embodiments, after obtaining the human face of the target object, because the scope of the human face is too small, which is not advantageous for the tracking, the scope of the human face may be expanded, such that various combinations of more parts, such as the human face and the should, and the neck, may be tracked, thereby increasing the robustness of the tracking control. The aircraft may expand the human region of the target object based on a predetermined expansion factor to obtain an expanded human face region. The second characteristic part of the target object included in the expanded human face region may be used as the characteristic part of the target object.

S203: tracking the target object based on the characteristic part.

In some embodiments, when the aircraft switches from near field tracking to far field tracking, the aircraft may detect whether the characteristic part currently tracked is a human body. If the characteristic part currently tracked is not a human body, the aircraft may switch from tracking the target object based on the human face of the target object to tracking based on the human body of the target object. If the characteristic part currently tracked is a human body, the aircraft may continue to track the human body of the target object. When the aircraft switches from far field tracking to near field tracking, the aircraft may detect whether the currently tracked characteristic part is a human face or a human face and shoulder. If the currently tracked characteristic part is not a human face or a human face and shoulder, the aircraft may switch the target object from the human body to the human face or human face and shoulder and start tracking the switched target object. If the currently tracked characteristic part is a human face or a human face and shoulder, the aircraft may continue to track the human face or the human face and shoulder of the target object.

In some embodiments, using the characteristic part to track the target object may include:

switching tracking the target object based on the human face of the target object to tracking the target object based on the first characteristic part.

In some embodiments, when the aircraft switches from near field tracking to far field tracking, tracking the target object based on the human face of the target object may be switched to tracking the target object based on the first characteristic part.

In some embodiments, using the characteristic part to track the target object may include:

switching tracking the target object based on the human body of the target object to tracking the target object based on the second characteristic part.

In some embodiments, when the aircraft switches from far field tracking to near field tracking, tracking the target object based on the human body of the target object may be switched to tracking the target object based on the second characteristic part.

In some embodiments, the aircraft may obtain a tracking parameter of the target object, determine a characteristic part of the target object, and track the target object based on the characteristic part. The characteristic part for tracking the target object may be re-determined based on the tracking parameter, thereby avoiding loss of the tracked target object, and increasing the robustness of the tracking control.

Figure 7:
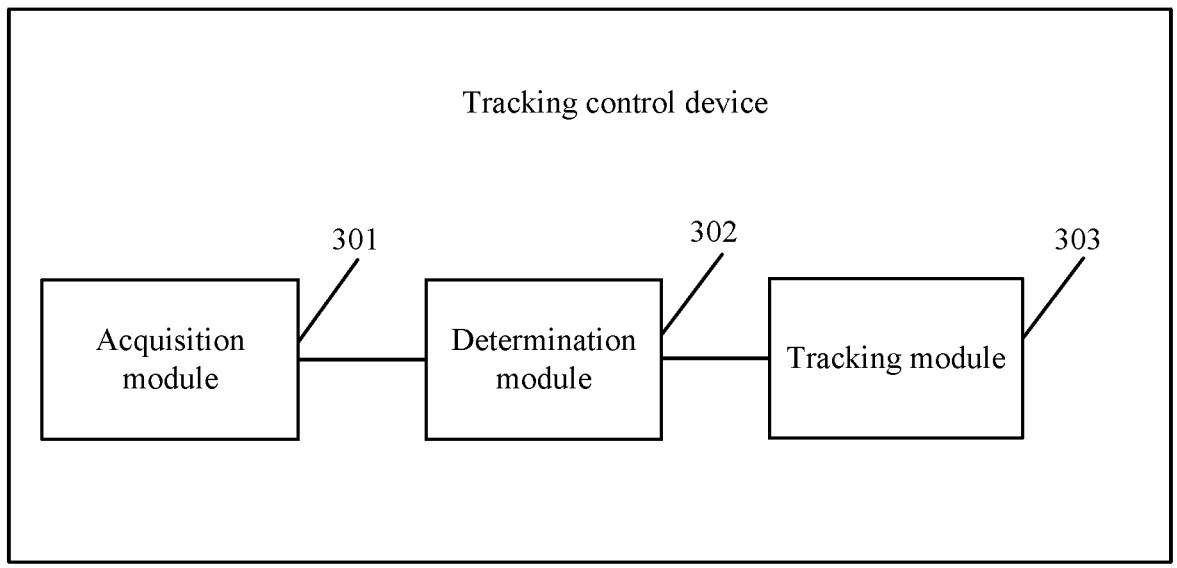
FIG. 7 is a schematic diagram of a tracking control device, according to an example embodiment.

FIG. 7 is a schematic diagram of a tracking control device. The tracking control device may include:

an acquisition module 301 configured to obtain a tracking parameter of the target object;

a determination module 302 configured to determine a characteristic part of the target object based on the tracking parameter; and a tracking module 303 configured to track the target object based on the characteristic part.

In some embodiments, the tracking parameter may include: a dimensional proportion of the tracking frame of the target object in the captured image and/or a distance between the target object and the aircraft.

In some embodiments, the determination module 302 may be configured to:

when the tracking parameter satisfies a predetermined first tracking condition, determine the characteristic part of the target object as the first characteristic part, the first characteristic part being the human body of the target object.

In some embodiments, the predetermined first tracking condition may include: the dimensional proportion is smaller than or equal to a first predetermined dimensional proportion value, and/or, the distance between the target object and the aircraft is greater than or equal to a first predetermined distance value.

In some embodiments, the determination module 302 may be configured to:

when the tracking parameter satisfies a second predetermined tracking condition, determine a second characteristic part of the target object based on a human face region of the target object, and determine the characteristic part of the target object as the second characteristic part.

In some embodiments, the second predetermined tracking condition may include: the dimensional proportion is greater than or equal to a second predetermined dimensional proportion value, and/or, the distance between the target object and the aircraft is smaller than or equal to a second predetermined distance value.

In some embodiments, the determination module 302 determining the characteristic part of the target object as the first characteristic part, the first characteristic part being the human body of the target object may include:

obtaining a center line of the tracking frame and one or more human bodies included in the captured image;

determining a human body among the one or more human bodies included in the captured image that is located closest to the center line as the human body of the target object; and determining the human body of the target object as the first characteristic part, and determine the first characteristic part as the characteristic part of the target object.

In some embodiments, the determination module 302 determining the second characteristic part of the target object based on the human face region of the target object, and determining the characteristic part of the target object as the second characteristic part may include:

performing a human face recognition in the tracking frame, and obtaining the human region of the target object in the captured image;

expanding the human face region of the target object based on a predetermined expansion factor to obtain an expanded human face region; and determining the second characteristic part of the target object included in the expanded human face region as the characteristic part of the target object.

In some embodiments, the second characteristic part may include the human face and shoulder of the target object.

In some embodiments, the tracking module 303 may be configured to:

switch tracking the target object based on the human face of the target object to tracking the target object based on the first characteristic part.

In some embodiments, the tracking module 303 may be configured to:

switch tracking the target object based on the human body of the target object to tracking the target object based on the second characteristic part.

In some embodiments, the acquisition module 301 may obtain a tracking parameter of the target object. The determination module 302 may determine the characteristic part of the target object based on the tracking parameter. The tracking module 303 may track the target object based on the characteristic part. The characteristic part of the target object may be re-determined based on the tracking parameter, thereby avoiding loss of the tracked target object, and increasing the robustness of the tracking control.

Figure 8:
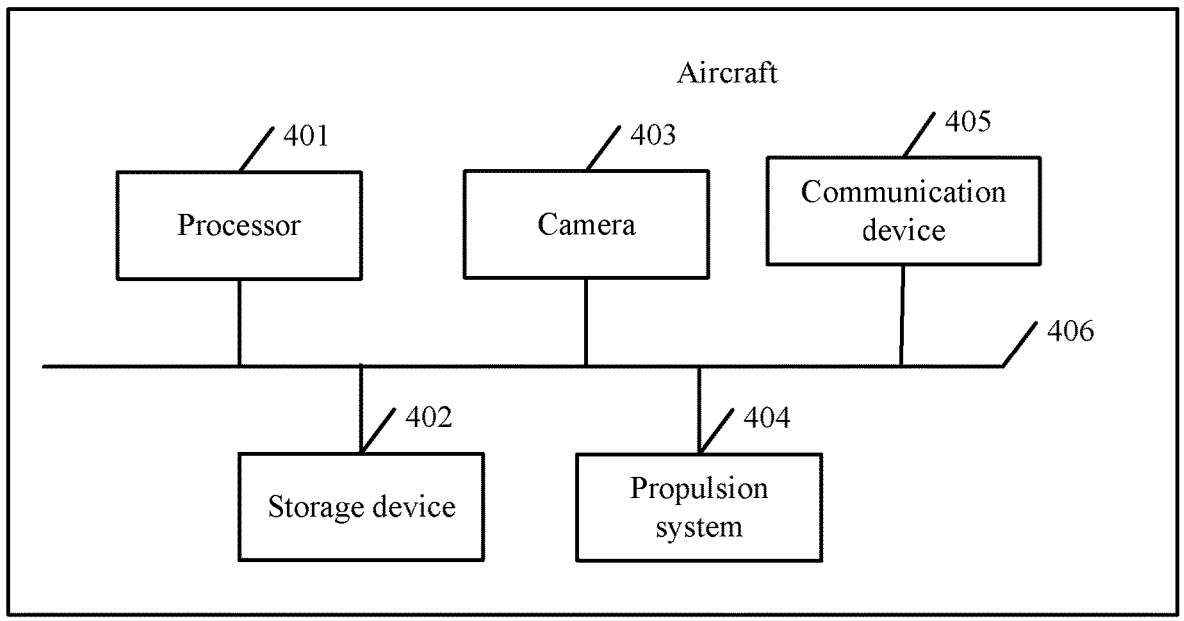
FIG. 8 is a schematic diagram of an aircraft, according to an example embodiment.

FIG. 8 is a schematic diagram of an aircraft. As shown in FIG. 8, the aircraft may include: at least one processor 401, such as a CPU; at least one storage device 402, a camera 403, a propulsion system 404, a communication device 405. The processor 401, storage device 402, camera 403, propulsion system 404, and communication device 405 may be connected through a bus 406.

The propulsion system 404 may be configured to provide a propulsion for the flight of the aircraft. The communication device 405 may be configured to receive and transmit messages. The camera 403 may be configured to capture images.

The storage device 402 may be configured to store instructions. The processor 401 may retrieve program code stored in the storage device 402.

In some embodiments, the processor 401 may retrieve the program code stored in the storage device to execute the following operations:

obtaining a tracking parameter of the target object;

determining a characteristic part of the target object based on the tracking parameter; and tracking the target object based on the characteristic part.

In some embodiments, the tracking parameter may include: a dimensional proportion of the tracking frame of the target object in the captured image, and/or, a distance between the target object and the aircraft.

In some embodiments, the processor 401 determining the characteristic part of the target object based on the tracking parameter may include:

when the tracking parameter satisfies a first predetermined tracking condition, determining the characteristic part of the target object as the first characteristic part, the first characteristic part being the human body of the target object.

The first predetermined tracking condition may include: the dimensional proportion is smaller than or equal to a first predetermined dimensional proportion value, and/or, the distance between the target object and the aircraft is greater than or equal to a first predetermined distance value.

In some embodiments, the processor 401 determining the characteristic part of the target object based on the tracking parameter may include:

when the tracking parameter satisfies a second predetermined tracking condition, determining a second characteristic part of the target object based on a human face region of the target object, and determining the characteristic part of the target object as the second characteristic part.

The second predetermined tracking condition may include: the dimensional proportion is greater than or equal to a second predetermined dimensional proportion value, and/or, the distance between the target object and the aircraft is smaller than or equal to a second predetermined distance value.

In some embodiments, the processor 401 determining the characteristic part of the target object as the first characteristic part, the first characteristic part being a human body of the target object may include:

obtaining a center line of the tracking frame and one or more human bodies included in the captured image;

determining a human body among the one or more human bodies included in the captured image that is located closest to the center line as the human body of the target object; and determining the human body of the target object as the first characteristic part, and determining the first characteristic part as the characteristic part of the target object.

In some embodiments, the processor 401 determining the second characteristic part of the target object based on the human face region of the target object, and determining the characteristic part of the target object as the second characteristic part may include:

performing a human face recognition in the tracking frame, and obtaining a human face region of the target object included in the captured image;

expanding the human face region of the target object based on a predetermined expansion factor to obtain an expanded human face region; and determining the second characteristic part of the target object included in the expanded human face region as the characteristic part of the target object.

The second characteristic part may include a human face and shoulder of the target object.

In some embodiments, the processor 401 tracking the target object based on the characteristic part may include:

switching tracking the target object based on the human face of the target object to tracking the target object based on the first characteristic part.

In some embodiments, the processor 401 tracking the target object based on the characteristic part may include:

switching tracking the target object based on the human body of the target object to tracking the target object based on the second characteristic part.

In some embodiments, the processor 401 may obtain a tracking parameter of the target object, determine a characteristic part of the target object based on the tracking parameter, and tracking the target object based on the characteristic part. The characteristic part for tracking the target object may be re-determined based on the tracking parameter, thereby avoiding loss of the tracked target object, and increasing the robustness of the tracking control.

It is understood that for the above various embodiments of the disclosed method, for simplicity of the description, the method is described as a combination of a series of actions. A person having ordinary skills in the art can appreciate, the present disclosure is not limited by the described sequence of the actions, because according to the present disclosure, some steps may be executed in other orders or sequences, or may be executed simultaneously. In addition, a person having ordinary skills in the art can appreciate, the embodiments described herein are preferred embodiments. The actions and modules described may not necessarily needed for implementing the present disclosure.

A person having ordinary skills in the art can appreciate that in the disclosed various methods, some or all of the disclosed steps may be realized by a program instructing relevant hardware. The program may be stored in a non-transitory computer-readable storage medium. The storage medium may include a flash memory disk, a read-only memory ("ROM"), a random access memory ("RAM"), a magnetic disk, or an optical disc.

The above disclosed are only preferred embodiments, which do not limit the scope of the present disclosure. A person having ordinary skills in the art can understand all or part of the processes for realizing the embodiments, and may make equivalent modification based on the claims of the present disclosure, which still fall within the scope of the present disclosure.

What is claimed is:

1. A tracking control method, comprising:

obtaining a tracking parameter of a target object, the tracking parameter including at least one of a dimensional proportion of a tracking frame of the target object in a captured image or a distance between the target object and an aircraft;

determining a characteristic part of the target object for tracking the target object, including:

determining a human body of the target object as the characteristic part for tracking the target object in response to at least one of:

the dimensional proportion being smaller than or equal to a first predetermined dimensional proportion value, or the distance being greater than or equal to a first predetermined distance; and determining a part of the human body of the target object as the characteristic part for tracking the target object in response to at least one of:

the dimensional proportion being greater than or equal to a second predetermined dimensional proportion value, or the distance being smaller than or equal to a second predetermined distance value; and tracking the characteristic part of the target object.

2. The tracking control method of claim 1, wherein determining the human body of the target object as the characteristic part for tracking the target object comprises:

obtaining a center line of the tracking frame and one or more human bodies included in the captured image;

determining a human body among the one or more human bodies included in the captured image that is located closest to the center line as the human body of the target object; and determining the human body of the target object as the characteristic part for tracking the target object.

3. The tracking control method of claim 1, wherein determining the part of the human body of the target object as the characteristic part for tracking the target object comprises:

performing a human face recognition in the tracking frame, and obtaining the human face region of the target object in the captured image;

expanding the human face region of the target object based on a predetermined expansion factor to obtain an expanded human face region; and determining the expanded human face region as the characteristic part for tracking the target object.

4. The tracking control method of claim 3, wherein the expanded human face region comprises a human face and a shoulder of the target object.

5. A tracking control device, comprising:

a memory storing computer-executable program instructions; and a processor configured to execute the computer-executable program instructions to:

obtain a tracking parameter of a target object, the tracking parameter including at least one of a dimensional proportion of a tracking frame of the target object in a captured image or a distance between the target object and an aircraft;

determine a characteristic part of the target object for tracking the target object, including:

determining a human body of the target object as the characteristic part for tracking the target object in response to at least one of:

the dimensional proportion being smaller than or equal to a first predetermined dimensional proportion value, or the distance being greater than or equal to a first predetermined distance; and determining a part of the human body of the target object as the characteristic part for tracking the target object in response to at least one of:

the dimensional proportion being greater than or equal to a second predetermined dimensional proportion value, or the distance being smaller than or equal to a second predetermined distance value; and track the characteristic part of the target object.

6. The tracking control device of claim 5, wherein when determining the human body of the target object as the characteristic part for tracking the target object, the processor is further configured to execute the computer-executable program instructions to:

obtain a center line of the tracking frame and one or more human bodies included in the captured image;

determine a human body among the one or more human bodies included in the captured image that is located closest to the center line as the human body of the target object; and determine the human body of the target object as the characteristic part for tracking the target object.

7. The tracking control device of claim 5, wherein determining the part of the human body of the target object as the characteristic part for tracking the target object, the processor is further configured to execute the computer-executable program instructions to:

perform a human face recognition in the tracking frame, and obtaining the human face region of the target object in the captured image;

expand the human face region of the target object based on a predetermined expansion factor to obtain an expanded human face region; and determine the expanded human face region as the characteristic part for tracking the target object.

8. The tracking control device of claim 5, wherein the expanded human face region comprises a human face and a shoulder of the target object.

9. A tracking control method comprising:

determining a human face of a target object through human face recognition; and after determining the human face of the target object, controlling an aircraft to fly in a slant rear-upper direction or fly outwardly and spirally, including:

in response to a distance between the aircraft and the target object being smaller than a predetermined distance, tracking the target object using the human face of the target object; and in response to the distance between the aircraft and the target object being greater than or equal to the predetermined distance, tracking the target object using a human body of the target object.

* * * * *